United States Patent [19]

Kosarew

[11] Patent Number: 5,619,416
[45] Date of Patent: Apr. 8, 1997

[54] LABELING SYSTEM AND METHOD FOR AN ELECTRONIC PRICE LABEL

[75] Inventor: W. Tony Kosarew, Centerville, Ohio

[73] Assignee: NCR Corporation, Dayton, Ohio

[21] Appl. No.: 528,000

[22] Filed: Sep. 14, 1995

[51] Int. Cl.$^6$ .............................. G06F 17/60; G06F 19/00
[52] U.S. Cl. ................ 364/478.13; 235/375; 364/478.03
[58] Field of Search .......................... 364/478.01, 478.03, 364/478.13, 478.14, 478.15, 479.05, 401, 403; 414/274; 235/375, 385

[56] References Cited

U.S. PATENT DOCUMENTS

| | | | |
|---|---|---|---|
| 4,852,014 | 7/1989 | Schwenzer | 364/479.01 |
| 5,470,427 | 11/1995 | Mikel et al. | 156/387 |
| 5,550,745 | 8/1996 | Wurz | 364/478.03 |

Primary Examiner—Joseph Ruggiero

[57] ABSTRACT

A system and method are provided for automatically labeling an electronic price label (EPL) tag. A customer data file (CDF) includes a batch of records including a product description and corresponding record number. Labels are printed sequentially for the records contained in the CDF and are automatically applied to the EPL tags in a continuous process. The record number is printed on the tag in the form of a corresponding bar code, and the record number bar code and a serial number bar code also contained on the tag are automatically read. The CDF is updated for correlating the serial number with a respective record number. Optical scanners are provided for uncovering defects in visual displays of the tags, misapplied labels, and unreadable bar codes which are then rejected. A makeup batch of records is identified from the CDF to identify record numbers without corresponding serial numbers, with the makeup batch then being used to repeat the printing and applying steps for fully processing the first batch.

15 Claims, 3 Drawing Sheets

1

LABELING SYSTEM AND METHOD FOR AN ELECTRONIC PRICE LABEL

BACKGROUND OF THE INVENTION

The present invention relates generally to electronic price labels, and, more specifically, to applying face labels thereto.

A merchandising store, such as a grocery supermarket, displays items for sale on shelves, with a price label being provided for identifying the product by description, measure, and price. In order to automate product pricing, electronic price labels have been developed and are in current use at various locations.

In one form, the electronic price label (EPL) comprises a thin rectangular tag having face and back sides and suitable, low-power electronics therein. The EPL tag has a suitable visual electronic display such as a conventional liquid crystal display (LCD) which may operate continuously for an extended period of time on suitable battery power. The visual display typically includes multiple digits for displaying the desired retail price and unit price for example. Each digit is typically formed of seven segments conventionally arranged to display the numerals 0 through 9 when selectively energized.

The electronics of each tag are programmed during manufacture for providing a unique serial number (SN) to identify each tag, with each tag also typically including a back label or overlay which typically identifies the manufacture of the tag and includes a visual tag identification including for example the serial number assigned to and contained in the tag electronics. The identification is typically in the form of a conventional bar code such as a Code 3 of 9 bar code. The tag electronics typically also include a radio receiver so that the tag may be remotely reprogrammed for changing the display prices using a conventional radio transmitter within the store specifically designed therefor. In this way, product prices may be easily and quickly changed based on tag serial number.

However, each tag must also be associated with a given product and must include a face label or overlay identifying the specific product associated therewith, with the visual display presenting the corresponding price information to the shopper. Conventional face labels are typically preprinted to identify the specific products as well as including any desired additional information thereon such as the name of the store itself, and the universal product code (UPC) or SKU bar code if desired. The face labels are typically pressure sensitive labels already containing a suitable adhesive so that they may be easily applied and bonded to the face of the tag. As each label is applied to a respective tag, the corresponding tag serial number must be correlated with the product for allowing remote programming of the price thereof. In a typical store having hundreds or thousands of EPL tags, the manual face label application process takes a significant amount of time and is subject to human errors in application of the tags and correlating the serial numbers.

SUMMARY OF THE INVENTION

A system and method are provided for automatically labeling an electronic price label (EPL) tag. A customer data file (CDF) includes a batch of records including a product description and corresponding record number. Labels are printed sequentially for the records contained in the CDF and are automatically applied to the EPL tags in a continuous process. The record number is printed on the tag in the form of a corresponding bar code, and the record number bar code and a serial number bar code also contained on the tag are automatically read. The CDF is updated for correlating the serial number with a respective record number. Optical scanners are provided for uncovering defects in visual displays of the tags, misapplied labels, and unreadable bar codes which are then rejected. A makeup batch of records is identified from the CDF to identify record numbers without corresponding serial numbers, with the makeup batch then being used to repeat the printing and applying steps for fully processing the first batch.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
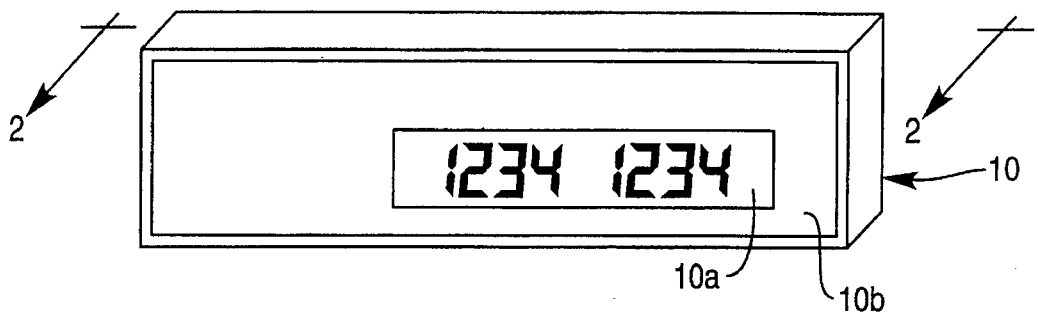
FIG. 1 is a perspective view of a face side of an exemplary EPL tag having a multi-digit electronic visual display thereon.

Illustrated in FIG. 1 is an exemplary electronic price label (EPL) tag 10 in rectangular form. The tag 10 may have any suitable length, height, and thickness ranging from small to large sizes as desired. The tag 10 has a visual electronic display 10a in the exemplary form of a liquid crystal display (LCD) on a front face or side 10b thereof. The tag 10 itself is conventional and includes suitable battery powered electronics therein which operate the display 10a, The display 10a has any suitable number of digits, with each digit typically being formed of seven segments arranged for selectively displaying the numerals 0 through 9. In this way, the display 10a may be conventionally programmed to display numbers indicative of retail price and unit price for a specific product for example.

More specifically, the tag 10 is preferably configured for use in an merchandising store to be secured to a shelf containing products, the price of which is identified in the tag 10. The electronics in each tag 10 conventionally include a radio receiver so that the tag may be reprogrammed remotely as desired for changing the price information on the display 10a. The tag 10 also includes a suitable memory device therein which is programmed at manufacture to include a unique serial number (SN) for identifying the specific tag 10. In this way, the tag may be reprogrammed remotely by radio waves based on the identifying SN, so that individual tags 10 may contain different price information for different products associated therewith as desired. In a typical store, there are hundreds or thousands of tags 10, with each tag 10 being capable of displaying different prices which may be conventionally changed as desired based on the unique SN.

Figure 2:
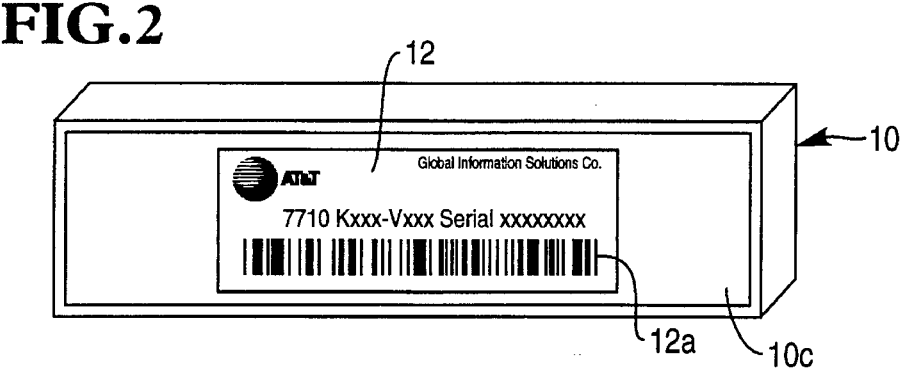
FIG. 2 is a perspective view of a back side of the EPL tag illustrated in FIG. 1 and taken generally along line 2—2 and illustrates an exemplary identification back label secured thereto.

During original manufacture of the tag 10, a suitable identification label 12 as illustrated in FIG. 2 is secured to any suitable location on the tag 10 such as back face or side 10c thereof. The back label 12 may include any desired information including identification of the manufacturer of the tag 10 and a code identifying the tag 10 itself. The code may be human readable to include any desired information including the specific serial number programmed internally into the tag itself. Preferably, the back label 12 also includes a machine readable serial number in the exemplary form of an identification (ID) bar code 12a which includes at least in part the SN programmed into the tag 10.

Figure 3:
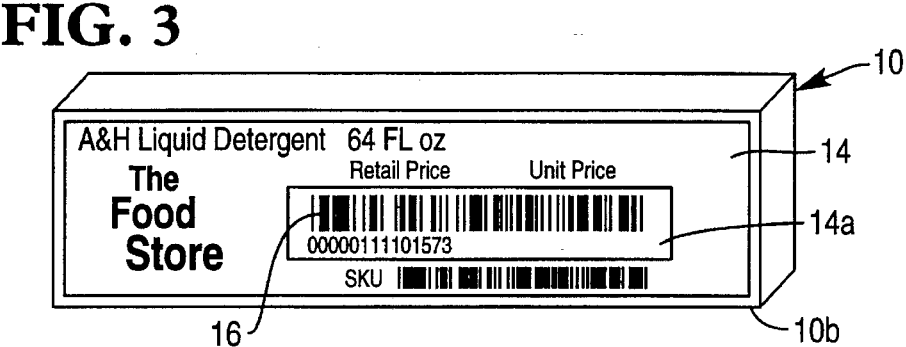
FIG. 3 is a perspective view of the front side of the EPL tag illustrated in FIG. 1 having a face label secured thereto, with the face label including an exemplary removable coupon containing a record number bar code.

A typical customer or merchant will require hundreds or thousands of the tags 10 for use in a given store, with each tag 10 being specifically provided for a different product to be sold within the store. Accordingly, it is desired to affix to the front side of the tag 10 as illustrated in FIG. 3 a suitable face label 14 including for example a printed product description, such as a liquid detergent; a unit of measure such as weight or volume; and size which is a specific numerical value of measure units. The face label 14 may include any additional information as desired such as the name of the specific store or merchant, trademarks, or artistic displays if desired. The face label 14 may also include a conventional Universal Product Code (UPC) also known as a SKU number in a conventional UPCE bar code.

Figure 4:
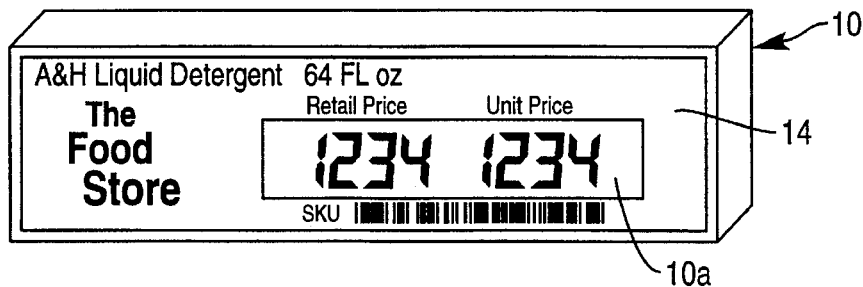
FIG. 4 is a perspective view of the EPL tag illustrated in FIG. 3 with the coupon being removed for exposing the visual display.

However, the specific serial number for the tag 10 illustrated in FIG. 3 must be correlated with the product description contained on the face label 14 to allow remote programming of price in the merchant's store. In accordance with one feature of the present invention, the face label 14 illustrated in FIG. 3 preferably includes a unique record number (RN) printed in a suitable machine readable form such as a Code 3 of 9 RN bar code 16. The RN bar code 16 may be located at any convenient position on the face label 14, or on a separate label specifically therefor if desired. In the preferred embodiment illustrated in FIG. 3, the face label 14 includes a removable patch or coupon 14a on which is printed the RN bar code 16. The coupon 14a is preferably sized to match the perimeter of the visual display 10a illustrated in FIG. 1 so that it may be manually torn away or removed at a subsequent time when it is no longer needed to expose the visual display 10a as illustrated in FIG. 4. The tag 10 illustrated in FIG. 4 is in final form having the printed label 14 suitably affixed thereto for attachment to an appropriate shelf location for identifying the product associated therewith in the merchant's store.

Figure 5:
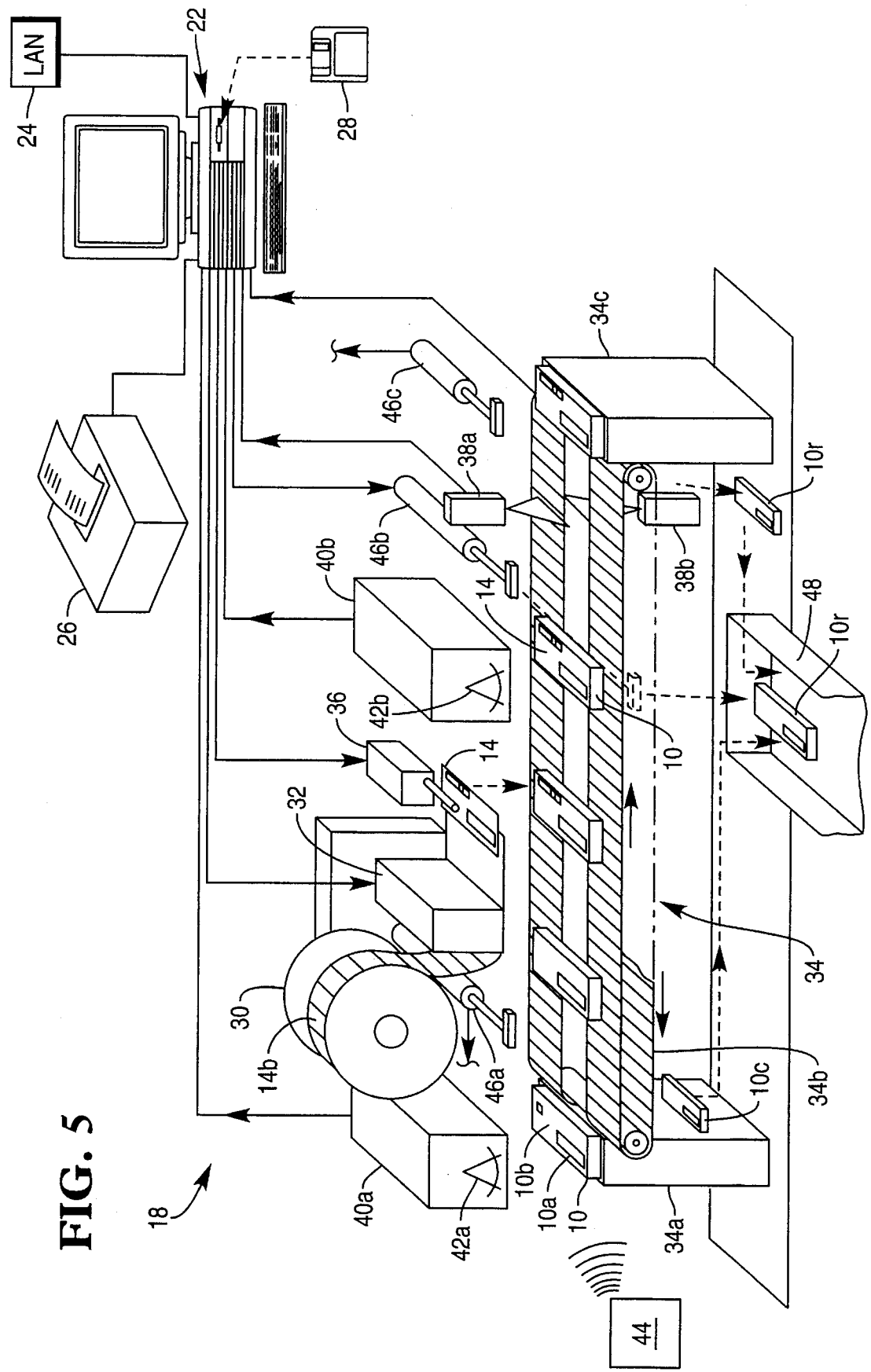
FIG. 5 is a schematic representation of a system for printing and applying the face labels illustrated in FIG. 3 to the EPL tags in accordance with an exemplary embodiment of the present invention.
Figure 6:
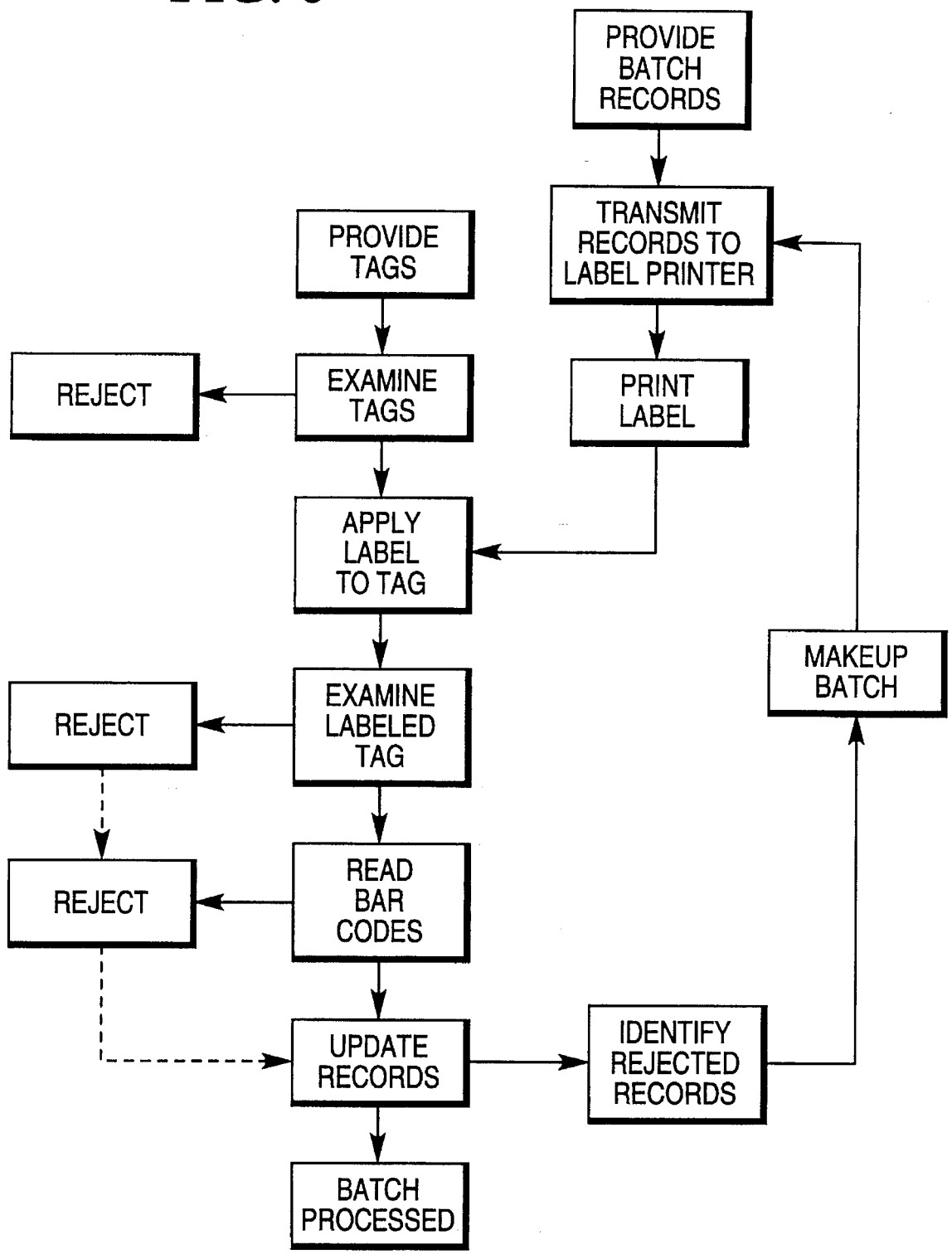
FIG. 6 is a flow chart representation of an exemplary method for printing and applying the face labels illustrated in FIG. 3 to the EPL tags.

Illustrated schematically in FIG. 5 is an exemplary embodiment of an apparatus or system 18 in accordance with the present invention for automatically and continuously printing and applying the face labels 14 to the EPL tags 10 in a batch mode for completing a specific merchant's order therefor. FIG. 6 is a flow chart representation of exemplary method steps for completing the batch processing of the tags 10 and labels 14.

The process starts by providing a Customer Data File (CDF) to a programmable controller 22 which is preferably in the form of a conventional personal computer (PC). The controller 22 may be joined to a conventional Local Area Network (LAN) 24 and to a conventional system printer 26 for printing various production reports as desired. The controller 22 may have for example an 80486 CPU operating at 66 MHz, with a suitable hard drive memory device therein and conventional software for the LAN 24 and conventional electronic mail as desired. The CDF may therefore be downloaded into the controller 22 by any suitable method via the LAN 24 or E-Mail, or from a conventional floppy disk 28 insertable into a corresponding disk reader within the controller 22.

The CDF may include various fields of data associated with corresponding products to be sold by a given merchant. Included as part of the CDF are various printing fields to be printed on the face labels 14 including for example a product description such as product name, unit of measure, and size. The printing fields may also include the name of the specific merchant or store or other desired information for being printed on the labels 14. As shown in FIG. 5, the labels are provided initially as label blanks 14b in continuous roll form on a label roll 30 suitably mounted for unrolling the label blanks 14b. The label blanks 14b may be provided either completely blank of printing, or may be conventionally preprinted with common information such as the name of the specific merchant or store and art work as desired which will be repeated for all the printed labels 14 for a given merchant. The label blanks 14b are preferably conventional pressure sensitive labels which include an adhesive, with the labels being simply peeled from a liner for being applied and adhesively secured to the tags 10.

As indicated above with respect to FIG. 3, it is desired to print the unique RN in the RN bar code 16 which is used later in the process for correlating the specific face labels 14 to the corresponding serial numbers of the tags 10. Accordingly, the CDF is preferably provided with a corresponding unique RN for each product description for which a tag 10 is to be supplied to the merchant.

The system 18 illustrated in FIG. 5 is preferably operated in batch mode for processing a specific order for a specific merchant. The CDF for the merchant therefore includes an original or first batch of the product records each having a plurality of printing fields to be printed on the face label blanks 14b, with each record including the product description and corresponding RN. As shown in FIG. 5, a conventional label printer 32, such as a thermal printer, is operatively joined to the controller 22 for sequentially printing on the blank labels 14b the desired printing fields for corresponding records of the batch, with the RN being printed in the form of the RN bar code 16 on the coupon 14a portion of the face label 14 as illustrated in FIG. 3. The printer 32 should print at a suitable speed and resolution such as 5 inches per second and 200 dots per inch, and includes a suitable roller feed for transporting the label blanks 14b from the roll 30 through the printer 32 itself. The controller 22 transmits the product records to the printer 32 sequentially wherein they may be temporarily stored in memory queues as desired for ensuring continuous and uninterrupted printing of the labels 14.

Suitable means 34 are provided for transporting unlabeled tags 10 in sequence for receiving face labels 14 printed by the printer 32. The transporting means 34 may take any conventional form including an infeed hopper 34a of either top or bottom feeding design which may hold from 250 to about 500 tags 10 as desired. A suitable number of the tags 10 are temporarily stored so that hopper reloading is not too often and may be handled by a single person. Disposable magazines are preferred for periodically refilling the infeed hopper 34a during operation.

A conventional conveyor belt system 34b is provided for transporting the individual tags 10 from the infeed hopper 34a for processing of the labels 14 thereon. In the exemplary embodiment illustrated in FIG. 5, the conveyor system 34b includes two spaced apart conveyor belts across which may be carried the tags 10 so that the back label 12 illustrated in FIG. 2 may be observed from below, with the tag face side 10b facing upwardly. In an alternate embodiment, a single conveyor belt having spaced apart windows therein may be used for providing visual access from below to the back label 12. The conveyor belt or belts may also include suitable alignment ribs within which the tags 10 may be placed for maintaining accurate alignment thereof as they proceed along the conveyor belt.

At the downstream end of the conveyor belt system 34b is a conventional outfeed hopper 34c into which processed tags 10 are delivered and stored. The outfeed hopper preferably includes a suitable magazine or stackable trays for collecting processed tags 10 and allowing manual removal thereof by a single operator.

As shown in FIG. 5, the printer 32 is disposed above the conveyor belt system 34b, with the tags 10 being transported one-by-one below the printer 32. Means 36 are provided for suitably applying the printed labels 14 dispensed from the printer 32 to respective ones of the tags 10 being carried or transported by the conveyor system 34b. The label applying means or applicator 36 is operatively joined to the controller 22 for coordinated action, and may take any conventional form which removes individual printed labels 14 from the liner and accurately applies the face label 14 to the face 10b of the tag 10. For example, the tag face 10b preferably has a small ridge around its circumference within which the printed face label 14 is secured.

In order to correlate the unique record number of the printed label 14 with the unique serial number of the tag 10 to which a respective face label 14 is applied, suitable means 38a,b are provided for reading or optically scanning both the tag SN and the label RN from the ID bar code 12a on the back label 12 and from the RN bar code 16 on the applied face label 14. In the exemplary embodiment illustrated in FIG. 5, the reading means include a conventional first laser optical bar code scanner 38a disposed above and adjacent to the downstream end of the conveyor belt system 34b for reading from above the RN bar codes 16. A conventional second laser optical bar code scanner 38b is disposed below and adjacent to the downstream end of the conveyor belt system 34b for reading from below the tag ID bar code 12a. The first and second scanners 38a and 38b are suitable operatively joined to the controller 22 to communicate thereto the tag SN and the corresponding label RN simultaneously read from each of the face labeled tags 10.

The controller 22 has suitable software programmed therein which is effective for updating the CDF by recording or writing thereto for the product records the tag SN corresponding with the applied label RN which correlates the applied label 14 to the specific tag 10. The CDF for each product record is therefore updated to match the printed face label 14 with the corresponding SN for the tag so that the merchant may program the required pricing information for viewing from the visual display 10a in the store. In this way, the face labels 14 are automatically printed for specific product descriptions and applied to an identified or correlated tag 10 in a continuous and fast batch processing which completely eliminates correlation errors.

In order to maximize processing speed of the print and apply system 18, the provided CDF is suitably completely read-first by the controller 22 which sequentially transmits the product description and RN to the printer 32 for continuously printing corresponding face labels 14. The RN therefore identifies the specific product record and face label 14 which is attached to a respective tag 10. Upon completion of the entire batch of product records in the CDF, feedback from the optical scanners 38a,b then allows the controller 22 to update, i.e., write-to, the CDF to assign or correlate respective serial numbers with the product records using the RN. The updated CDF is then provided to the merchant along with the processed tags 10 so that the merchant can readily identify by serial number the corresponding product description for each of the tags 10 supplied. The record number is therefore no longer necessary, since the merchant will subsequently use the tag serial number itself for programming prices into the respective tags 10 for the identified products associated therewith.

The record number is therefore used to advantage in the system 18 for ensuring correlation of the printed labels 14 with the unique tags 10. The RN may also be used to advantage in the event that any of the label tags 10 is found to be defective for any appropriate reason, which should therefore be rejected and not supplied to the merchant. In this regard, the process preferably further includes the step of rejecting any of the tags 10 for defective displays 10a, for misapplied printed labels 14, and for unreadable bar codes 12a and 16 prior to updating or recording the correlation data in the CDF.

In order to provide quality control of the printing and labeling process, means 40a,b are provided for examining the tags 10 carried by the conveyor belt system 34b for defective displays 10a and misapplied face labels 14. The examining means 40a,b may take any suitable conventional form including a first optical image system or scanner 40a operatively joined to the controller 22 and disposed suitably adjacent to the conveyor belt system 34b and upstream of the label applicator 36 for optically examining the tag visual display 10a. The first image scanner 40a includes a conventional first camera 42a effective for visually inspecting the LCD display 10a to verify that all segments within the display are on. In this regard, a conventional radio transmitter 44 is positioned adjacent to the infeed hopper 34a and is suitably controlled, by a dedicated personal computer for example, to transmit to the tags 10 a suitable test signal for operating the visual display 10a in a test mode wherein all of the segments of each of the digits thereof are turned on. In this way, the first camera 42a is used to optically observe the lighted display 10a of each of the tags 10, with the first image scanner 40a being suitably programmed to recognize defective visual displays 10a. Any tag 10 showing one or more segments which are not on during the test should be ejected as a rejected tag.

Any suitable means may be used for ejecting or rejecting from the conveyor belt system 34b any tag 10 having a defective display 10a. In the exemplary embodiment illustrated in FIG. 5, a first rejecting means 46a is positioned adjacent to the conveyor belt system 34b upstream of the label applicator 36 and is operatively joined to the controller 32. The first rejector 46a may take any suitable form such as a suitably actuated extension arm which pushes a rejected tag 10r from the conveyor belt into a suitable reject tray or hopper 48 provided specifically therefor. In this way, when the first image scanner 40a recognizes a defective tag 10 this is communicated to the controller 22 which in turn actuates the first rejector 46a to synchronously reject the tag 10r before a face label 14 may be applied thereto. Accordingly, a printed label 14 is not wasted on an initially defective tag 10.

A second conventional optical image system or scanner 40b is similarly operatively joined to the controller 22 and is disposed adjacent to the conveyor belt system 34b downstream of the label applicator 36 for optically examining placement of the printed face label 14 on the tag 10. The second image scanner 40b similarly includes a conventional second camera 42b for imaging the face label 14 applied to the tag 10. The second image scanner 40b includes suitable software for recognizing misapplied labels 14 which are not within the desired perimeter placement on the tag face side 10b to a suitably desired accuracy. The label applicator 36 may from time to time misapply printed face labels 14 to the tags 10 which defective tags should not be provided to the merchant. Accordingly, a conventional second tag rejector 46b, which may be identical to the first tag rejector 46a, is operatively joined to the controller 22 and is disposed downstream of the second camera 42b and upstream of the bar code scanners 38a,b for synchronously rejecting misapplied label tags prior to reading thereof by the bar code scanners 38a,b. The first rejector 46a is effective to reject tags 10 prior to applying the printed face label 14 thereto. The second rejector 46b rejects tags 10 having misapplied face labels 14 prior to bar code scanning thereof, but the unique record number associated with the misapplied face label 14 is therefore also rejected.

Some of the processed tags 10 may reach the bar code scanners 38a,b and have unreadable bar codes and should also be rejected prior to updating of the CDF. In this case, the bar code scanners 38a,b will attempt to read both the ID bar code 12a and the RN bar code 16 on the applied label tags 10, with the unreadability of either bar code causing rejection of the corresponding tag 10r. The bar code scanners 38a,b may be programmed for attempting multiple reads within the short time available as the tags 10 are carried along the conveyor belt system 34b. If a bar code is unreadable, the corresponding tag 10r will be suitably synchronously ejected or rejected by a third rejector 46c, which may be identical to the first and second rejectors 46a,b. The third rejector 46c is operatively joined to the controller 22 and is disposed adjacent to the conveyor belt system 34b downstream of the bar code scanners 38a,b so that failure of the bar code scanners 38a,b to read either one of the bar codes causes the controller 22 to actuate the third rejector 46c and thereby reject the corresponding tag 10r. In this situation also, the so rejected tag 10r having a label 14 affixed thereto will result in the loss of the corresponding RN therefor.

Any defective display tag 10 rejected prior to the application of a face label 14 thereto may be suitably repaired and recycled as desired. However, once a printed face label 14 is affixed to a respective tag 10, the unique RN for the corresponding product has therefore been used. If an applied label tag is subsequently rejected due to a misapplied label or unreadable bar codes, the unique RNs associated therewith nevertheless remain therewith. Accordingly, during the updating step of the CDF, serial numbers for those rejected tags 10r will not be written into the corresponding record fields. The SN record field will then retain its default or unassigned value indicating the failure of applying a tag SN to a respective product record number.

Accordingly, the controller 22 includes additional conventional software effective for identifying from the CDF, after the first batch of records is first sequentially processed to completion through recording and updating of the CDF, all records corresponding with the rejected applied label tags. This is easily done since the CDF updating step correlates the tag serial numbers with corresponding product record numbers in the case where the face labels 14 are properly applied to the tags 10 and both the tag ID bar code 12a and the label RN bar code 16 are readable and transmitted back to the CDF. Any missing tag serial numbers in corresponding ones of the product records is easily identified. The identified records associated with rejected misapplied label tags or unreadable bar code tags are then assembled into a makeup batch of records specifically therefor reusing the corresponding RNs. The makeup record batch is then transmitted to the printer 32 for repeating the printing and subsequent steps until the original or first batch is fully processed. The makeup batch may be as simple as a single record for a single rejected tag 10r, but will typically be a relatively small batch compared with the original batch of records processed. The unique product record number used in the system 18 therefor allows for the continuous processing of face labels 14 and tags 10 without interruption for maximizing the speed of production irrespective of rejected tags. Replacement tags for the rejected tags are then processed in the makeup batch as a subsequent operation.

In the preferred embodiment of the invention, the printing fields from the CDF are read-only and transmitted sequentially to the printer 32 for the entire first batch prior to updating or recording the serial numbers therein for continuously processing the face labels 14 and tags 10 for maximizing speed. As the RNs and SNs are read by the scanners 38a,b, the data may be temporarily stored in the controller 22 until the entire first batch is processed. The CDF is then updated by writing thereto the create the makeup batch of records which are then read-only and transmitted from the CDF to the printer 32 for continuously processing the makeup batch. In this mode of operation, maximum speed may be obtained using the same controller 22 for controlling the various operating components of the system 18. If desired, however, a plurality of similarly configured controllers 22 may be provided for controlling different operations of the system 18 in parallel for further maximizing processing speed.

When the updated CDF includes assigned serial numbers for each of the record numbers therein, the original batch has been fully processed, with the resulting tags being readily identified by RN and SN. However, the record number has now fulfilled its usefulness and is no longer needed, and therefore the tag coupon 14a containing the RN bar code 16 may be manually removed or stripped from the face label 14 to reveal the visual display 10a therebehind. The completed batch of tags 10 is then distributed to the merchant along with the updated CDF for the merchant's use in associating the product descriptions with respective tag serial numbers.

Suitable production and merchant reports may be printed by the system printer 26 to provide any desired information. For example daily production for the system 18 may be printed showing production by specific CDF name, number of tags printed, errors and associated rejected tags. Any or all of the record fields in the CDF may be printed. Furthermore, daily transactions in real time, such as log-on, time and date of starting and completing jobs may also be printed.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A method for labeling tags, each having a visual electronic display and a serial number (SN) in the form of an identification (ID) bar code comprising:

providing a customer data file (CDF) including a first batch of records each having a plurality of printing fields including product description and corresponding record number (RN);

printing sequentially on respective labels said printing fields for corresponding records, with said RN being printed in the form of an RN bar code;

applying said printed labels to respective tags;

reading both said tag SN and label RN from said ID bar code and RN bar code on said tags; and recording in said CDF for said records said tag SN corresponding with said RN.

2. A method according to claim 1 further comprising rejecting said tags for defective displays, for misapplied printed labels, and for unreadable bar codes prior to said recording step.

3. A method according to claim 2 wherein:

said defective display tags are rejected prior to said applying step;

said misapplied label tags are rejected prior to said reading step; and said unreadable bar code tags are rejected after said reading step.

4. A method according to claim 2 wherein said rejecting step comprises:

examining said tags for defective displays prior to said printing step, and rejecting defective display tags prior to applying said printed label thereto;

examining said printed label tags for misapplied printed labels, and rejecting misapplied printed label tags prior to said reading step; and attempting to read both said ID bar code and said RN bar code on said applied label tags, and rejecting unreadable bar code tags.

5. A method according to claim 4 wherein said examining step optically views said tags.

6. A method according to claim 4 wherein said reading step optically reads said bar codes.

7. A method according to claim 2 further comprising:

identifying from said CDF after said first batch of records is first sequentially processed to completion through said recording step all records corresponding with said rejected tags in a makeup batch of records; and repeating said printing and subsequent steps for said makeup batch of records corresponding with said rejected tags until said first batch is fully processed.

8. A method according to claim 7 further comprising transmitting from said CDF said printing fields sequentially for said entire first batch for said printing step prior to said CDF recording step for continuously processing said labels and tags.

9. A system for labeling tags each having a visual electronic display and a serial number (SN) in the form of an identification (ID) bar code comprising:

a programmable controller for containing a customer data file (CDF) including a first batch of records each having a plurality of printing fields including a product description and a corresponding record number (RN);

means operatively joined to said controller for sequentially printing on said labels said printing fields for corresponding records, with said RN being printed in the form of an RN bar code;

means for transporting said tags in sequence;

means for applying said printed labels to respective ones of said tags carried by said transporting means;

means for reading both said tag SN and said label RN from said ID bar code and said RN bar code on said applied label tags, said reading means being operatively joined to said controller to communicate thereto said tag SN and label RN; and said controller being effective for recording in said CDF for said records said tag SN corresponding with said label RN.

10. A system according to claim 9 further comprising:

means for examining said tags for defective displays and misapplied labels; and means for rejecting from said transporting means tags having defective displays, misapplied labels, and unreadable bar codes.

11. A system according to claim 10 wherein said rejecting means are effective to reject:

said defective display tags prior to transport to said label applying means;

said misapplied label tags prior to transport to said reading means; and said unreadable bar code tags after transport past said reading means.

12. A system according to claim 10 wherein said examining means comprise:

a first optical image scanner disposed adjacent to said transporting means and upstream of said label applying means for optically examining said tag visual display; and a second optical image scanner disposed adjacent to said transporting means and downstream of said label applying means for optically examining placement of said label on said tag.

13. A system according to claim 12 wherein said reading means comprise:

a first optical bar code scanner disposed adjacent to said transporting means for reading said RN bar code; and a second optical bar code scanner disposed adjacent to said transporting means for reading said ID bar code.

14. A system according to claim 10 wherein said controller is further effective for:

identifying from said CDF after said first batch of records is first sequentially processed to completion through said recording step all records corresponding with said rejected tags in a makeup batch of records; and transmitting sequentially said printing fields of said makeup batch to said printing means for printing and applying labels to additional tags for said makeup batch.

15. A system according to claim 14 wherein said controller is further effective for transmitting from said CDF to said printing means said printing fields sequentially for said entire first batch prior to recording in said CDF for continuously processing said labels and tags.

* * * * *